United States Patent Office 3,840,522
Patented Oct. 8, 1974

3,840,522
HEXAHYDROBENZAZOCINES
William T. Comer, Evansville, Ind., and Aubrey A. Larsen, Scarsdale, N.Y., and Homer C. Scarborough, deceased, by Phyllis Jean Scarborough, widow and personal representative, Evansville, Ind., assignors to Mead Johnson & Company, Evansville, Ind.
No Drawing. Application Jan. 5, 1970, Ser. No. 821, which is a continuation-in-part of application Ser. No. 464,241, June 15, 1965, both now abandoned. Divided and this application Aug. 14, 1972, Ser. No. 280,346
Int. Cl. C07d 41/00, 99/04
U.S. Cl. 260—239 BB   9 Claims

ABSTRACT OF THE DISCLOSURE

The compounds of formulas:

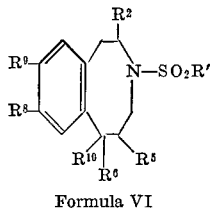   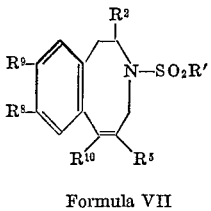

Formula VI   and   Formula VII wherein $R^2$ and $R^5$ are hydrogen atoms or lower alkyl groups having from 1 to 4 carbon atoms; $R^8$ and $R^9$ are hydrogen, hydroxy, lower alkyl, or lower alkoxy groups each having up to 4 carbon atoms, or considered together they are the methylenedioxy group; $R'$ is lower alkyl having up to 6 carbon atoms, aryl or aralkyl each having up to 12 carbon atoms; $R^6$ is hydrogen, hydroxyl, chloro, or bromo, and $R^{10}$ is hydrogen, alkyl, or aryl each respectively having up to 8 or 10 carbon atoms. These compounds are prepared from their 6-oxo analogs (Formula VI wherein $R^6$ and $R^{10}$ together are an oxygen atom) and are converted into end products having analgesic and anti-inflammatory properties by removal of the $R'SO_2$— group and introduction of an aliphatic group in its place.

Cross Reference to Related Applications

This is a division of copending application Ser. No. 821, filed Jan. 5, 1970, and now abandoned, which in turn is a continuation-in-part of U.S. patent application Ser. No. 464,241, filed June 15, 1965, and now abandoned.

FIELD OF THE INVENTION

This invention is concerned with a class of chemical compounds possessing analgesic and anti-inflammatory properties, as well as other biological activities. It also concerns methods for their use in the treatment of various pathologic conditions, a process for their synthesis, and intermediates useful therein.

SUMMARY OF THE INVENTION

This class of compounds is described by the following structural formulas:

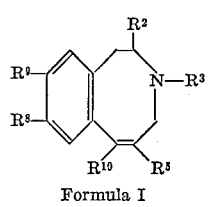   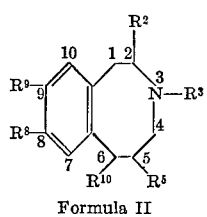

Formula I   Formula II

In these formulas, $R^2$ and $R^5$ are hydrogen atoms or lower alkyl groups having from 1 to 4 carbon atoms. $R^3$ is alkyl, alkenyl, or alkynyl each having up to about 6 carbons; or cycloalkyl, cycloalkenyl, cycloalkylalkyl, cycloalkenylalkyl, aralkyl, or aralkenyl, each having up to about 9 carbon atoms. $R^3$ may contain up to two substituents selected from carbalkoxy, alkoxy, alkanoyloxy, each having up to about 4 carbon atoms, or hydroxy. $R^8$ and $R^9$ are hydrogen, hydroxy, lower alkyl, or lower alkoxy groups each having up to about 4 carbon atoms, or considered together they are the methylenedioxy group. $R^{10}$ is hydrogen, alkyl having up to 8 carbon atoms, or aryl having up to 10 carbon atoms.

For nomenclature purposes the ring positions are numbered in Formula II. Those skilled in the art will recognize Formula I as the 5,6-dehydro analog of Formula II. The present invention also includes within its scope the acid addition salts of the substances of Formulas I and II.

The following are mentioned as representative of compounds of the present invention having biological activity.

3-Cyclopropylmethyl-1,2,3,4,5,6-hexahydro-3-benzazocine hydrochloride,
3-(3-methyl-2-butenyl)-1,2,3,4,5,6-hexahydro-3-benzazocine hydrochloride,
3-methyl-1,2,3,4,5,6-hexahydro-3-benzazocine hydrochloride,
3-propargyl-1,2,3,4,5,6-hexahydro-3-benzazocine hydrochloride, and
ethyl 1,2,3,4,5,6-hexahydro-3-benzazocine-3-propionate hydrochloride, possess analgesic activity. The following substances possess anti-inflammatory activity:

3-methyl-1,2,3,4-tetrahydro-3-benzazocine hydrochloride,
3-methyl-1,2,3,4,5,6-hexahydro-3-benzazocine hydrochloride,
3-methyl-1,2,3,4-tetrahydro-3-benzazocine hydrochloride is also a potent hypotensive agent of short duration.

The products of Formulas I and II are administered to mammals in non-toxic doses ranging from 3 mg./kg. of body weight of the host up to 100 mg./kg. of body weight or higher depending upon the particular compound being employed and the severity of the condition being treated. Toxicities are low enough so as not to interfere with the desired biologic effects.

The substances may be administered by the oral or parenteral routes in order to achieve biologic effect, and they may be formulated into a variety of conventional pharmaceutical forms including tablets, capsules, elixirs, solutions, suspensions, injectible solutions, etc. For the latter purpose, they may be employed as the pharmaceutically acceptable acid addition salts. By that term is meant acid addition salts of the products of this invention in which the anion of the salt does not contribute materially to the overall toxicity of the salt nor interfere with the pharmaceutical use thereof. Pharmaceutically acceptable salts may be formed with a great variety of acids including hydrochloric, hydrobromic, hydroiodic, sulfuric, phosphoric, nitric, glutaric, succinic, maleic, citric, acetic, propionic, methane-sulfonic, gluconic, lauryl sulfuric, or p-toluenesulfonic acids, and other organic and inorganic acids meeting the above toxicity requirements.

Detailed Description of the Invention

The compounds of this invention are prepared from the substances of Formula III according to the following scheme in which $R^2$, $R^5$, $R^8$, $R^9$, and $R^{10}$ have the same meaning as in Formulas I and II and $R'$ is a lower alkyl group of up to about 6 carbon atoms, or an aryl, or aralkyl group of up to about 12 carbon atoms. Intermediates of Formula III are the subject of patent application Ser. No. 464,239 filed June 15, 1965, now U.S. Patent No. 3,442,890. The intermediates wherein $R^8$ and $R^9$ are hydroxyl are prepared by cleavage of the corresponding alkoxy compounds with acidic reagents such as 48% aqueous HBr or aluminum bromide.

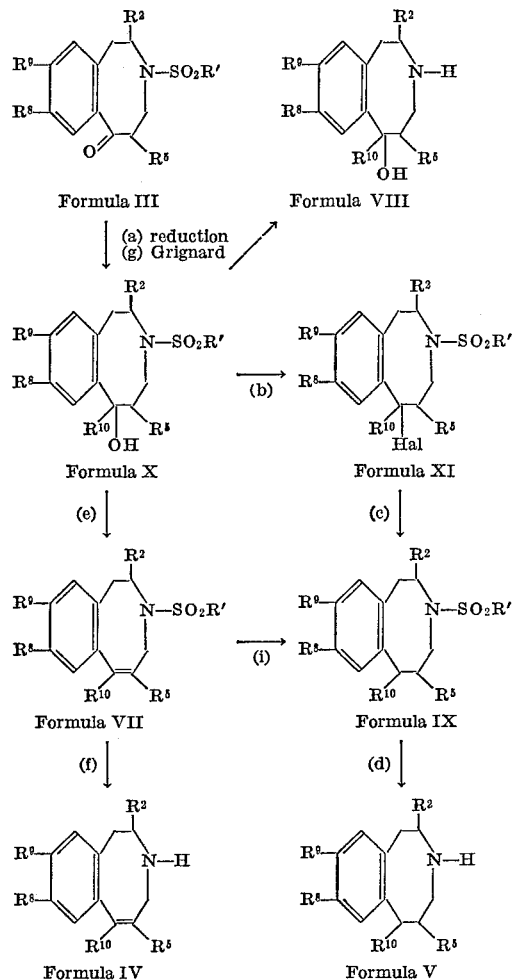

As a first step in transformation of the intermediates of Formula III, the ketone group in the 6-position is reduced to a hydroxyl. This can be carried out by any of a number of means known to those skilled in the art for the reduction of a ketone carbonyl group to the corresponding carbinol. We have found catalytic hydrogenation at from 1 to about 5 atmospheres of pressure over Raney nickel catalyst at room temperature to be particularly satisfactory, yields of the carbinol intermediate of Formula X in which $R^{10}$ is H routinely exceeding 80%. Another reduction technique is reaction of the ketone with borane to yield the carbinol using a solution of borane in an ether solvent such as tetrahydrofuran.

The 6-oxo group of the intermediates of Formula III is also reactive with the Grignard reagent in normal fashion. This is signified in the scheme by step (g). Grignard reagents, RMgX, in which X is chlorine, bromine or iodine and R is alkyl having up to 8 carbon atoms or aryl having up to 10 carbon atoms such as methylmagnesium iodide, butyl-magnesium bromide, 1-octylmagnesium iodide, phenylmagnesium bromide and 2-naphthylmagnesium bromide are operable in the process and provide intermediates of Formula X in which $R^{10}$ is alkyl or aryl as defined above. A typical procedure is given in Example 15 which follows.

For the preparation of the compounds of Formula V, the carbinol is halogenated in step (b), resulting in formation of a 6-halo intermediate, Formula XI. It is preferred that the halogen, symbolized by Hal in the formula, be chlorine or bromine. Conventional halogenating conditions for the transformation of an alkanol to the corresponding alkyl halide may be employed. For example when $R^{10}$ is H, thionyl chloride or phosphorus tribromide in an inert liquid reaction medium such as a halogenated alkane, ether, or aromatic hydrocarbon serves well. A reaction temperature of the order of 70–120° C. is recommended.

The Formula XI intermediate resulting from step (b) is then dehalogenated in step (c). Since the halogen of the Formula XI intermediate is a benzyl-type halogen uncomplicated by intramolecular interactions insofar as this reduction step is concerned, conventional methods for the removal of a benzyl halogen may be employed. Again, Raney nickel catalytic hydrogenation at a pressure of 2–5 atmospheres has been found to be particularly satisfactory. The reduction takes place at room temperature.

Intermediates of Formula IX may also be obtained by hydrogenation of a Formula VII intermediate in Step (i). This is illustrated in Example 16(b) where catalytic reduction over a platinum catalyst is employed. Other methods of olefinic reduction are also applicable.

The hexahydrobenzazocine sulfonamide resulting from steps (c) or (i), Formula IX, is then converted to the substance of Formula V in step (d) by refluxing with concentrated aqueous hydrobromic acid in the presence of a readily brominated compound such as a hydroxyaromatic compound including phenol, cresol, resorcinol, etc. to absorb by-product bromine. Phenol with 48% hydrobromic acid has been found to be satisfactory, resulting in completion of the transformation in about 4 hrs. in yields in excess of 80%.

An alternate method for cleavage of the 3-$R'SO_2$ group is by reaction with sodium napthalene in a glycol ether solution according to the method of Sungchul Ji, et al., J. Am. Chem. Soc. 89, 5311 (1967). This method is represented by step (j) in the reaction scheme and is illustrated in Example 17 which follows. It is equally applicable to steps (d) and (f). The preferred solvent is dimethoxyethane but other glycol ethers may be substituted. Dimethyl ether is also operable; but being a gas at room temperature, it is not convenient for ordinary operation since pressurized equipment is needed. The reaction is conducted at room temperature or within the range of about 20–60° C. employing 3 to 6 chemical equivalents of sodium napthalene per equivalent of 3-$R'SO_2$ intermediate. The product is recovered after first destroying excess sodium napthalene by treatment of the reaction mixture with water in sufficient volume to neutralize the color of the reagent. The process is particularly suitable for those intermediates of Formulas IV, V and VIII in which one or both of $R^8$ and $R^9$ are hydroxy or alkoxy, or together methylenedioxy.

The 5,6-dehydro compounds of Formula IV are prepared from the intermediates of Formula X by dehydration in step (e) and cleavage of the $R'SO_2$ group in step (f). We have found preferred conditions for dehydration step (e) to involve heating the hydroxyl intermediate of Formula X with molten pyridine hydrochloride. Yields in excess of 65% are obtained. Step (f) can be carried out in the same fashion as steps (d) or (j), but it is preferred to accomplish the transformation to the product of Formula IV in a single combined step which avoids the separate isolation of the intermediates of Formula VII. This can be accomplished under substantially the conditions described for step (e), but preferably employing a higher temperature. Thus, if it is desired to isolate the intermediate of Formula VII, a reaction temperature of about 170–180° C. is employed for that step. If it is desired to produce the product of Formula IV without isolating the intermediate of Formula VII, a reaction temperature of about 210° C. is employed. In either event, a minor amount of the product least favored by the conditions is, nevertheless, produced. It is sometimes desirable in the interest of efficiency to isolate both from the reaction mixture.

The intermediates pictured in the foregoing reaction scheme as Formulas VII, IX, X, and XI are considered part of the present invention. Formula VI, which is a composite of IX, X, and XI, and Formula VII are drawn below by way of summary. In these formulas, R', $R^2$, $R^5$, $R^8$, $R^9$, and $R^{10}$ have the same meaning as indicated above. $R^6$ is hydrogen, hydroxyl, chlorine, or bromine.

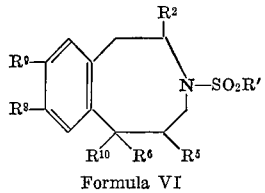
Formula VI

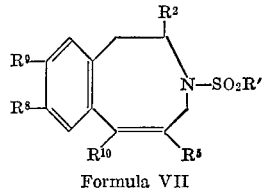
Formula VII

Formulas IV and V in the reaction scheme are variants of Formulas I and II in which $R^3$ is hydrogen. The products of Formulas IV and V serve as intermediates for the preparation of the products of Formulas I and II. Conventional methods for the preparation of tertiary amines from secondary amines are employed for this purpose. These methods include, for example, methylation with a mixture of formaldehyde and formic acid; acylation with a carboxylic acid chloride to provide an amide and subsequent reduction of the amide, for example, with lithium aluminum hydride; alkylation with an activated alkyl halide, ether, or ester such as propargyl bromide, ethoxymethylene malonic ester; dimethyl sulfate, triethyl phosphate, or methyl p-toluenesulfonate; or alkylation with a simple alkyl halide. In the latter two processes it is sometimes advantageous, although not essential, to first form a metal salt of the secondary amine of Formula IV or V with a reagent such as butyllithium, phenyllithium, sodium amide, or sodium hydride, and to react the resulting salt with the alkyl halide. Micheal condensation of the secondary amine of Formula IV or Formula V with an activated olefins such as ethyl acrylate may also be mentioned as a method for the preparation of compounds according to the present invention. Other methods will occur to those skilled in the art.

Description of the Preferred Embodiments

The following examples constitute specific embodiments of the present invention and are presented to further illustrate the manner of practicing the invention. All nuclear magnetic resonance data reported was obtained with a Varian A-60 instrument operated at 60 mc.

Step (a)

EXAMPLE 1.—3 - Benzenesulfonyl - 6 - hydroxy-1,2,3,4,5,6 - hexahydro - 3 - benzazocine.—A mixture of 28.4 g. (0.09 mole) of 3-benzenesulfonyl - 1,2,3,4,5,6 - hexahydro - 3 - benzazocine - 6 - one (U.S. Pat. No. 3,442,890), a portion of Raney nickel catalyst weighing about 5 g., and 250 ml. of tetrahydrofuran as suspending medium, is hydrogenated with agitation until 0.09 mole of hydrogen has been absorbed. If absorption ceases prior to the consumption of this quantity, a further portion of fresh catalyst is added and hydrogenation is continued. The benzazocin - 6 - one starting material is not completely soluble in the tetrahydrofuran reaction vehicle, but dissolution occurs as the reaction proceeds. After completion of the reaction, the catalyst is removed by filtration and the solvent is evaporated from the filtrate in vacuo. The residual oil crystallizes when mixed with isopropyl acetate, from which solvent it can be recrystallized; yield 24.0 g. (84%), m.p. 147.5–149.5° C.

Anal.—Calcd. for $C_{17}H_{19}NO_3S$: C, 64.33; H, 6.03; N, 4.41; S, 10.11. Found: C, 64.29; H, 6.00; N, 4.43; S, 9.97.

This substance exhibits infrared absorption maxima at the following wave lengths: 2.85, 3.42, 6.75, 6.91, 7.29, 7.53, 8.63, 9.16, 9.62, 9.78, 9.99, 10.29, 10.94, 11.88, 13.05, 13.64, 13.85, 14.50, and 14.75µ.

The nuclear magnetic resonance spectrum measured on a 10% solution of this compound in deuterochloroform with tetramethylsilane as reference has the following characteristics:

| δ (p.p.m.) | Relative area |
|---|---|
| 7.40 | 9 |
| 5.27 | 1 |
| 4.2–1.2 | 8 |
| 2.65 | 1 |

EXAMPLE 2.—3-Methanesulfonyl-6-hydroxy-1,2,3,4,5,6-hexahydro-3-benzazocine. — This substance is prepared in 90% yield according to the method of Example 1, employing 3-methanesulfonyl-1,2,3,4,5,6-hexahydro-3-benzazocin-6-one as starting material, m.p. 165–166° C.

Anal.—calcd. for $C_{12}H_{17}NO_3S$: C, 56.44; H, 6.71; N, 5.49. Found: C, 56.14; H, 6.46; N, 5.32.

EXAMPLE 3.—3 - Benzenesulfonyl-6-hydroxy-8,9-dimethoxy-1,2,3,4,5,6-hexahydro-3-benzazocine. — A suspension of 50 g. (0.13 mole) of 3-benzenesulfonyl-8,9-dimethoxy-1,2,3,4,5,6-hexahydro-3-benzazocin-6-one in 750 ml. of tetrahydrofuran is treated in dropwise fashion with 150 ml. of a 1 M borane solution in tetrahydrofuran. The mixture is stirred for 3 hrs. at room temperature and then treated in dropwise fashion with water to hydrolyze the reaction complex. When this is completed the mixture is poured into an open vessel containing several volumes of water relative to the reaction mixture and the solid which separates is collected. This material is a hydrated form of the desired product. It is suspended in diisopropyl ether and refluxed until all water is eliminated, yield 46 g. (92%), m.p. 159–161° C.

Anal.—calcd. for $C_{19}H_{23}NO_5S$: C, 60.46; H, 6.14; N, 3.71. Found: C, 60.76; H, 6.11; N, 3.88.

Step (b)

EXAMPLE 4. — 3-Benzenesulfonyl-6-chloro-1,2,3,4,5,6-hexahydro-3-benzazocine.—A mixture of 31.7 g. (0.1 mole) of 3-benzenesulfonyl-6-hydroxy-1,2,3,4,5,6-hexahydro-3-benzazocine, 23.8 g. (0.2 mole) of thionyl chloride, and 125 ml. of dry methylene chloride is warmed on a steam bath for about 45 min. The reaction mixture is then concentrated in vacuo until all volatile materials have been removed and a yellow oil remains as residue. This material solidifies on chilling in an ice bath. It is crystallized from 95% ethanol and then recrystallized from isopropyl acetate, yielding 24.7 g. (74%) of the desired product, m.p. 139–141° C.

Anal.—calcd. for $C_{17}H_{16}ClNO_2S$: C, 60.79; H, 5.40; N, 4.17; S, 9.55; Cl. 10.56. Found: C, 61.08; H, 5.47; N, 4.05; S, 9.59; Cl. 10.32.

EXAMPLE 5. — 3 - Benzenesulfonyl - 6-chloro-8,9-dimethoxy-1,2,3,4,5,6-hexahydro-3-benzazocine.—The procedure of Example 4 is modified to the use of 3-benzenesulfonyl - 6-hydroxy-8,9-dimethoxy-1,2,3,4,5,6-hexahydro-3-benzazocine as starting material, resulting in production of the desired compound substantially as described in Example 4.

EXAMPLE 6.—3-Methanesulfonyl-6-bromo-1,2,3,4,5,6-hexahydro-3-benzazocine.—A mixture of 25.5 g. (0.1 mole) of 3 - methanesulfonyl-6-hydroxy-1,2,3,4,5,6-hexahydro-3-benzazocine and 27.1 g. (0.1 mole) of phosphorous tribromide in 125 ml. of dry methylene chloride is warmed on the steam bath for about 1 hr. The reaction mixture is then cooled, washed in turn with water, 5% aqueous sodium hydroxide, and brine, and then methylene chloride solution dried over magnesium sulfate. It is then concentrated by distillation of volatile components in vacuo at steam bath temperature. The residue is an oil which crystallizes on chilling.

Step (c)

EXAMPLE 7.—3-Benzenesulfonyl-1,,2,3,4,5,6-hexahydro-3-benzazocine.—A mixture of 22.2 g. (0.066 mole) of 3-benzenesulfonyl-6-chloro - 1,2,3,4,5,6 - hexahydro - 3-benzazocine, 16.4 g. (0.2 mole) of anhydrous sodium acetate, and about 10 g. of Raney nickel catalyst is suspended in about 150 ml. of ethanol and hydrogenated at a pressure of about 50 lbs. per square inch. Hydrogenation is completed after the absorption of 0.066 mole of hydrogen. The reaction mixture is heated to boiling on a steam bath and filtered. The filtrate is concentrated in vacuo yielding a white solid which is triturated with water and collected on a filter; yield, 18.7 g. (94%), m.p. 107–108.5° C. This material is recrystallized successively from heptane, isopropyl ether, and isopropyl acetate, m.p. 107–108.5° C.

Anal.—Calcd. for $C_{17}H_{19}NO_2S$: N, 4.65; S, 10.64. Found: N, 4.61; S, 10.55.

This substance exhibits infrared absorption maxima at the folowing wave lengths: 3.42, 6.70, 6.90, 7.30, 7.40, 7.50, 7.62, 8.60, 8.83, 9.17, 9.36, 9.49, 9.77, 10.09, 10.89, 11.68, 12.10, 12.91, 13.05, 13.13, 13.28, 13.80, 14.48, and 14.89$\mu$.

EXAMPLE 8.—3-Methanesulfonyl - 1,2,3,4,5,6-hexahydro-3-benzazocine.—This substance is prepared according to Example 7 using 3-methanesulfonyl-6-bromo-1,2,3,4,5,6-hexahydro-3-benzazocine as starting material.

EXAMPLE 9.—3 - Benzenesulfonyl-8,9-dimethoxy-1,2,3,4,5,6 - hexahydro-3-benzazocine.—This substance is prepared according to Example 7 employing 3-benzenesulfonyl-6-chloro-8,9-dimethoxy - 1,2,3,4,5,6 - hexahydro-3-benzazocine as starting material.

Step (d)

EXAMPLE 10.—1,2,3,4,5,6 - Hexahydro-3-benzazocine and the Hydrochloride Salt Thereof.—A mixture of 15.1 g. (0.05 mole) of 3-benzenesulfonyl-1,2,3,4,5,6-hexahydro-3-benzazocine, 15 g. of phenol, and 100 ml. of freshly distilled 48% hydrobromic acid is heated at reflux with stirring for 4 hrs. The reaction mixture is then cooled in an ice bath, treated with sufficient 40% aqueous sodium hydroxide to liberate the product as the free base, and extracted with three 125 ml. portions of ethyl ether. The combined ether extracts are washed successively with water and brine, and dried over magnesium sulfate. The solvent is then distilled in vacuo, yielding 10.6 g. of 1,2,3,4,5,6-hexahydro-3-benzazocine as an oil. The oil is mixed with ethanolic hydrogen chloride, and the solution diluted with ether resulting in crystallization of 7.9 g. (80%) of 1,2,3,4,5,6-hexahydro-3-benzazocine hydrochloride. This material is recrystallized from a mixture of ethanol and ethyl acetate, m.p. 234–235.5° C.

Anal.—Calcd. for $C_{11}H_{15}N \cdot HCl$: C, 66.82; H, 8.16; N, 7.09; Cl, 17.93. Found: C, 66.53; H, 7.89; N, 6.91; Cl, 17.99.

This substance exhibits absorption in the infrared at the following wave lengths: 3.42, 3.6–3.8, 4.05, 6.37, 6.71, 6.8–7.1, 7.23, 9.27, 9.40, 11.13, 12.14, 12.97, 13.14, 13.30, 13.96$\mu$.

EXAMPLE 11.—1,2,3,4,5,6 - Hexahydro-6-methyl-3-benzazocine Hydrochloride.—This material is prepared from 3-benzenesulfonyl-6-methyl-1,2,3,4,5,6-hexahydro-3-benzazocine according to Example 10. The product weighs 8 g. (99.5%), m.p. 183–185° C.; after recrystallization from acetonitrile, m.p. 184–185.5° C.

Anal.—Calcd. for $C_{12}H_{17}N \cdot HCl$: C, 68.07; H, 8.57; N, 6.62. Found: C, 68.09; H, 8.76; N, 6.64.

Step (e)

EXAMPLE 12. 3-Benzenesulfonyl-1,2,3,4-tetrahydro-3-benzazocine.—A mixture of 8 g. (0.025 mole) of 3-benzenesulfonyl-1,2,3,4,5,6-hexahydro - 6 - hydroxy-3-benzazocine and 24 g. of pyridine hydrochloride is heated at 180° C. for 1 hr. A molten mass forms. At the conclusion of the reaction period, the mass is cooled and triturated with 90 ml. of water. The insoluble material is collected by filtration and recrystallized from methanol, yielding 5 g. (66.5%) of the desired product. This material is recrystallized first from isopropyl acetate and then from methanol, m.p. 137–138° C.

Anal.—Calcd. for $C_{17}H_{17}NO_2S$: C, 68.20; H, 5.73; N, 4.68; S, 10.71. Found: C, 68.52; H, 5.95; N, 4.56; S, 10.78.

Step (f)

EXAMPLE 13. 1,2,3,4-Tetrahydro-3-benzazocine and the Hydrochloride Salt Thereof.—Application of the method of Example 10 to 3-benzenesulfonyl-1,2,3,4-tetrahydro-3-benzazocine affords the above identified product. 1,2,3,4-Tetrahydro-3-benzazocine hydrochloride can also be obtained by operation on the filtrate of the aqueous trituration of the cooled melt described in Example 12. Adjustment of this filtrate to a basic pH and extraction with ether yields an ethereal solution of 1,2,3,4-tetrahydro-3-benzazocine, which can be recovered by removal of the solvent therefrom. Conversion of the crude free base to the hydrochloride by treatment with ethanolic hydrogen chloride and recrystallization from absolute ethanol yields the desired product in 10% yield; m.p. 242–243.5° C.

Anal.—Calcd. for $C_{11}H_{13}N \cdot HCl$. C, 67.51; H, 7.21; N, 7.16. Found: C, 67.57; H, 7.31; N, 6.92.

This material exhibits infrared absorption maxima at the following wave lengths: 3.42, 3.6–3.7, 3.81, 4.00, 4.17, 6.38, 6.72, 6.84, 6.92, 7.16, 7.27, 9.04, 9.25, 9.38, 10.50, 10.72, 11.65, 12.05, 12.41, 12.74, 13.12, 13.50, 14.05$\mu$.

The yield of this material can be increased if the reaction temperature in Example 11 is increased from 180° C. to 210° C. This results in a decrease in the yield of 3-benzenesulfonyl-1,2,3,4-tetrahydro - 3 - benzazocine obtained to 28%, but affords 49% of 1,2,3,4-tetrahydro-3-benzazocine hydrochloride.

EXAMPLE 14. 6-Methyl-1,2,3,4-tetrahydro-3-benzazocine Acetate.—A melt of 24 g. of pyridine hydrochloride is prepared and 12 g. (0.036 mole) of 3-benzenesulfonyl-6-hydroxy-6-methyl-1,2,3,4,5,6-hexahydro - 3 - benzazocine is carefully added thereto. The melt is heated for 15 min. at 203–205° C. The mixture is cooled to room temperature, suspended in water, hydrochloric acid added to pH 3, and insoluble material filtered. The solution is treated with charcoal, basified, and extracted with ether. The ether is washed with brine, dried, and concentrated in vacuo to an oil. The oil is dissolved in acetic acid, the solution evaporated and the solid recrystallized from acetonitrile-diethyl ether to give 2.9 g. (34.5%) of product, m.p. 125.5–127.5° C. The salt decomposes if dried above room temperature.

Anal.—Calcd. for $C_{12}H_{15}N \cdot C_2H_4O_2$: C, 72.07; H, 8.21; N, 6.00. Found: C, 72.01; H, 8.48; N, 6.00.

Step (g)

EXAMPLE 15.—3-Benzenesulfonyl - 1,2,3,4,5,6-hexahydro-6-hydroxy-6-methyl-3-benzazocine.—To a stirred solution of 300 ml. (0.9 mole) of 3M methylmagnesium bromide in diethyl ether a solution of 94.5 g. (0.3 mole) of 3-benzenesulfonyl-1,2,3,4,5,6-hexahydro - 3 - benzazocine-6-one in 1.5 l. of warm tetrahydrofuran is added in dropwise fashion. The solution is stirred and heated at reflux for 48 hrs., chilled and treated with 144 ml. of a saturated aqueous ammonium chloride solution. The precipitate is separated and washed with tetrahydrofuran. The combined tetrahydrofuran solutions are then concentrated in vacuo to a residue. The residue is dissolved in 300 ml. diethyl ether, washed twice with 5% solution of hydrochloric acid, once with brine, and dried over anhydrous magnesium sulfate. The ether is distilled, and the residue recrystallized from isopropyl acetate, yield, 66.5 g. (67%), m.p. 122.5–124° C.

*Analysis.*—Calcd. for $C_{18}H_{21}NO_3S$: C, 65.23; H, 6.39; N, 4.23. Found: C, 64.93; H, 6.37; N, 4.09.

Substitution of 1-octylmagnesium iodide, phenylmagnesium bromide, or 2-naphthylmagnesium bromide for the Grignard reagent in Example 15 yields the following substances:

3-benzenesulfonyl-1,2,3,4,5,6-hexahydro-6-hydroxy-6-(1-octyl)-3-benzazocine.
3-benzenesulfonyl-1,2,3,4,5,6-hexahydro-6-hydroxy-6-phenyl-3-benzazocine.
3-benzenesulfonyl-1,2,3,4,5,6-hexahydro-6-hydroxy-6-(2-naphthyl)-3-benzazocine.

Steps (e) and (i)

EXAMPLE 16.—3-Benzenesulfonyl-6-methyl-1,2,3,4,5,6-hexahydro-3-benzazocine.—

(a) Dehydration.—Pyridine hydrochloride, 40 g., and 15 g. (0.045 mole) of 3-benzenesulfonyl-6-hydroxy-6-methyl-1,2,3,4,5,6-hexahydro-3-benzazocine are carefully mixed, and the mixture is heated at 170° C. for 18 min. After cooling, 70 ml. of water is added, and the mixture is extracted with ether. The ether extracts are dried and concentrated *in vacuo* to give 13 g. of crude dehydration product.

(b) Reduction.—The dehydration product is dissolved in 900 ml. acetic acid and hydrogenated using platinum oxide as the catalyst. The reduction mixture is heated during hydrogenation at about 60° C. Hydrogen absorption to the extent of about 88% of theoretical occurs during 6 hrs. The catalyst is removed by filtration and the filtrate concentrated *in vacuo*. The residue is recrystallized from isopropyl acetate-heptane mixture and yields, 10 g. (71%) of product, m.p. 105.1–107° C.

*Anal.*—calcd. for $C_{18}H_{21}NO_2S$: C, 68.54; H, 6.71; N, 4.44; S, 10.16. Found: C, 68.72; H, 6.83; N, 4.33; S, 10.24.

Step (j)

EXAMPLE 17.—8,9-Dimethoxy-1,2,3,4,5,6-hexahydro-6-hydroxy-3-benzazocine.—A solution of 105 g. (0.66 mole) of sodium-naphthalene (N.D. Scott et al., J. Amer. Chem. Soc. *58*, 2442 (1936)) in 450 ml. of dimethoxyethane is prepared and treated dropwise with a solution of 25 g. (0.066 mole) of 3-benzenesulfonyl-8,9-dimethoxy-1,2,3,4,5,6-hexahydro-6-hydroxy-3-benzazocine (EXAMPLE 3) in 160 ml. of dimethoxyethane. The reaction mixture is stirred for one hour and then treated with several milliliters of water, just sufficient to decompose unreacted sodium-naphthalene which is evident when the reaction solution is decolorized. The bulk of the by-product napthalene is removed after vacuum distillation of the solvent by trituration of the residue with hexane. The remaining residue is then purified by column chromotography on 300 g. of alumina. The residue is dissolved in methylene chloride and tranferred to the alumina column which is then developed first with ether to remove any remaining traces of naphthalene, then with a 1% solution of methanol in ether to remove unreacted starting material. Finally, 20% methanol in ether is used to collect the product; yield, 8.6 g. (55%).

EXAMPLES 18–26.—The preceding examples illustrate the reactions of Steps a–j shown in the scheme for a number of compounds of the present invention having relatively simple structures. These procedures are, however, typical and may be readily adapted to the preparation of other compounds of the invention by substitution of appropriate starting materials as will be apparent to those skilled in the art. Table I illustrates this with respect to additional specific examples. These substances are then transformed into the biologically active N—$R^3$ compounds as is illustrated in subsequent examples.

TABLE I

[Example number 18–26.—1,2,3,4,5,6-hexahydro-3-benzazocines]

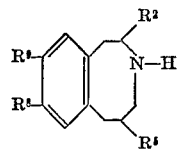

| Example number | $R^2$ | $R^5$ | $R^8$ | $R^9$ | Starting material applied in Example 1 and transformed according to Example 4, 7, and 17 |
|---|---|---|---|---|---|
| 18 | $CH_3$ | H | H | H | 3-benzenesulfonyl-2-methyl-1,2,3,4,5,6-hexahydro-3-benzazocin-6-one. |
| 19 | $n$-$C_4H_9$ | H | H | H | 3-benzenesulfonyl-2-($n$-butyl)-1,2,3,4,5,6-hexahydro-3-benzazocin-6-one. |
| 20 | H | $CH_3$ | H | H | 3-benzenesulfonyl-5-methyl-1,2,3,4,5,6-hexahydro-3-benzazocin-6-one. |
| 21 | H | $n$-$C_4H_9$ | H | H | 3-benzenesulfonyl-5-($n$-butyl)-1,2,3,4,5,6-hexahydro-3-benzazocin-6-one. |
| 22 | H | H | $CH_3$ | H | 3-benzenesulfonyl-8-methyl-1,2,3,4,5,6-hexahydro-3-benzazocin-6-one. |
| 23 | H | H | $n$-$C_4H_9O$ | H | 3-benzenesulfonyl-8-($n$-butoxy)-1,2,3,4,5,6-hexahydro-3-benzazocin-6-one. |
| 24 | H | H | $CH_3O$ | H | 3-benezenesulfonyl-8-methoxy-1,2,3,4,5,6-hexahydro-3-benzazocin-6-one. |
| 25 | H | H | $CH_3$ | $CH_3O$ | 3-benezenesulfonyl-8-methyl-9-methoxy-1,2,3,4,5,6-hexahydro-3-benzazocin-6-one. |
| 26 | H | H | Methylenedioxy | | 9 3-benzenesulfonyl-8,9-methylenedioxy-1,2,3,4,5,6-hexahydro-3-benzazocin-6-one. |

EXAMPLES 27–35.—The 5,6-dehydro analogs of the substances illustrated in Examples 18–26, are prepared by application of Examples 1, 12, and 17 in turn, to various 3 - benzenesulfonyl - 1,2,3,4,5,6-hexahydro-3-benzazocin-6-one starting materials. Further illustrations of this with respect to specific examples are given in Table II.

TABLE II

[Examples 27–35.—1,2,3,4-tetrahydro-3-benzazocines]

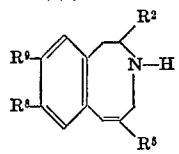

| Example number | $R^2$ | $R^5$ | $R^8$ | $R^9$ | Starting material applied in Example 1 and transformed according to Examples 12 and 17 |
|---|---|---|---|---|---|
| 27 | $CH_3$ | H | H | H | 3-benzenesulfonyl-2-methyl-1,2,3,4,5,6-hexahydro-3-benzazocin-6-one. |
| 28 | $n$-$C_4H_9$ | H | H | H | 3-benzenesulfonyl-2-($n$-butyl)-1,2,3,4,5,6-hexahydro-3-benzazocin-6-one. |
| 29 | H | $CH_3$ | H | H | 3-benzenesulfonyl-5-methyl-1,2,3,4,5,6-hexahydro-3-benzazocin-6-one. |
| 30 | H | $n$-$C_4H_9$ | H | H | 3-benzenesulfonyl-5-($n$-butyl)-1,2,3,4,5,6-hexahydro-3-benzazocin-6-one. |
| 31 | H | H | $CH_3$ | H | 3-benzenesulfonyl-8-methyl-1,2,3,4,5,6-hexahydro-3-benzazocin-6-one. |
| 32 | H | H | $n$-$C_4H_9O$ | H | 3-benzenesulfonyl-8-($n$-butoxy)-1,2,3,4,5,6-hexahydro-3-benzazocin-6-one. |
| 33 | H | H | $CH_3O$ | H | 3-benzenesulfonyl-8-methoxyl-1,2,3,4,5,6-hexahydro-3-benzazocin-6-one. |
| 34 | H | H | $CH_3$ | $CH_3O$ | 3-benzenesulfonyl-8-methyl-9-methoxy-1,2,3,4,5,6-hexahydro-3-benzazocin-6-one. |
| 35 | H | H | Methylene-dioxy | | 3-benzenesulfonyl-8,9-methylenedioxy-1,2,3,4,5,6-hexahydro-3-benzazocin-6-one. |

The transformation of the products of Examples 10, 11, 13, 14, 17 and of Tables I and II into the products of Formulas I and II is illustrated in Examples 36–58 which follow.

EXAMPLE 36. 1,2,3,4,5,6 - Hexahydro - 3-methyl-3-benzazocine Hydrochloride.—A mixture of 4.8 g. (0.03 mole) of 1,2,3,4,5,6 - hexahydro-3-benzazocine, 2.8 g. (0.035 mole) of 37% aqueous formaldehyde, and 3.7 g. (0.08 mole) of 97–100% formic acid is heated for 3 hrs. at 145–170° C. The reaction mixture is then cooled, diluted with water, and adjusted to a basic pH with aqueous sodium hydroxide. The mixture is then extracted with several portions of ether and the combined ether extracts washed with water and dried over magnesium sulfate. The solvent is then evaporated *in vacuo*, yielding the desired product as a mobile oil weighing 4.75 g. This material is dissolved in absolute ethanolic hydrogen chloride and the resulting solution treated with sufficient ether to induce crystallization. The desired product crystallizes as a white solid weighing 4.16 g. (65%), m.p. 169.5–170° C.

*Anal.*—Calcd. for $C_{12}H_{17}N \cdot HCl$: C, 68.07; H, 8.57; Cl, 16.75. Found: C, 67.81; H, 8.47; Cl, 16.99.

EXAMPLE 37. 1,2,3,4,5,6-Hexahydro-3-phenethyl-3-benzazocine Hydrochloride.—A solution of 3.2 g. (0.02 mole) of 1,2,3,4,5,6-hexahydro-3-benzazocine and 2.5 g. (0.025 mole) of triethylamine in 200 ml. of anhydrous ether is treated in dropwise fashion with 3.4 g. (2.022 mole) of phenacetyl chloride, dissolved in 10 ml. of anhydrous ether. The reaction mixture is stirred at room temperature for 1 hr. By-product triethylamine hydrochloride is removed as a white precipitate by filtration and the filtrate is extracted with a further quantity of aqueous hydrochloric acid to remove remaining excess triethylamine. The ethereal solution is then washed with water, brine, and dried over magnesium sulfate. Evaporation of the solvent therefrom *in vacuo* yields 3-phenacetyl-1,2,3,4,5,6-hexahydro-3-benzazocine as a sweet-smelling oil. This material is reduced to the desired product without further purification as follows:

To a stirred suspension of 0.45 g. (0.012 mole) of lithium aluminum hydride in 25 ml. of refluxing dry tetrahydrofuran there is added 5.6 g. (0.02 mole) of 3-phenacetyl-1,2,3,4,5,6-hexahydro-3-benzazocine dissolved in 20 ml. of dry tetrahydrofuran, at a rate sufficiently rapid to maintain the mixture at the boiling point as a result of the exothermic reaction which ensues. Refluxing is continued for an additional 20 min. The reaction mixture is then decomposed by treatment with a small amount of water and aqueous sodium hyydroxide solution (about 2 ml. and 0.5 ml. respectively). Insoluble material is removed by filtration and washed with hot tetrahydrofuran. The combined tetrahydrofuran solutions are then concentrated *in vacuo*, yielding 3-phenethyl-1,2,3,4,5,6-hexahydro-3-benzazocine as a yellow oil. This material is treated with ethanolic hydrogen chloride, yielding 4.5 g. (38%) of the desired material. It is twice recrystallized from ethanol-ether, m.p. 210–212° C.

*Anal.*—calcd. for $C_{19}H_{23}N \cdot HCl$: C, 75.60; H, 8.01; N, 4.64; Cl, 11.75. Found: C, 75.63; H, 7.99; N, 4.72; Cl, 11.74.

This substance exhibits infrared absorption maxima at the following wave lengths: 3.42, 3.7–3.9, 6.68, 6.75, 6.86, 7.02, 10.6, 12.09, 13.09, 13.20 and 14.29μ.

EXAMPLES 38–45.—Example 37 is repeated substituting various acid halides for the phenacetyl chloride specified. Conversion of the intermediate amide by reduction with lithium aluminum hydride as described provides the analogous products which are identified in Table III where the acid halide reactants are also listed.

TABLE III

[Examples 38–45.—Additional 3-$R^3$-1,2,3,4,5,6-hexahydro-3-benzazocines]

| Example number | Acid chloride | Product |
|---|---|---|
| 38 | Caproyl chloride | 3-(*n*-hexyl)-1,2,3,4,5,6-hexahydro-3-benzazocine. |
| 39 | Cinnamoyl chloride | 3-(3-phenyl-2-propen-1-yl)-1,2,3,4,5,6-hexahydro-3-benzazocine. |
| 40 | Hex-2-enoyl chloride | 3-(hex-2-en-1-yl)-1,2,3,4,5,6-hexahydro-3-benzazocine. |
| 41 | Cyclohexane carbonyl chloride | 3-(cyclohexylmethyl)-1,2,3,4,5,6-hexahydro-3-benzazocine. |
| 42 | Cyclohex-1-ene carbonyl chloride | 3-(cyclohex-1-ene-1-yl-methyl)-1,2,3,4,5,6-hexahydro-3-benzazocine. |
| 43 | Acetyl chloride | 3-ethyl-1,2,3,4,5,6-hexahydro-3-benzazocine. |
| 44 | Propionyl chloride | 3-(*n*-propyl)-1,2,3,4,5,6-hexahydro-3-benzazocine. |
| 45 | Cyclopropylcarbonyl chloride | 3-cyclopropylmethyl-1,2,3,4,5,6-hexahydro-3-benzazocine.* |

*Obtained in 88% yield as the hydrochloride salt; recrystallized from propyl ether-acetonitrile, M.P. 149–151° C. *Anal.*, calcd., for $C_{15}H_{21}H \cdot HCl$: C, 71.54; H, 8.81; N, 5.56; Cl, 14.08. Found: C, 71.68; H, 8.55; N, 5.46; Cl, 13.99. This substance exhibits infrared absorption maxima at the following wave lengths: 3.4, 3.75–3.9, 6.1, 6.68, 6.77, 6.87, 7.00, 9.60, 9.72, 10.12, 10.40, 12.05, 13.08, and 13.89μ. The nuclear magnetic resonance spectrum measured on a 10% solution of the compound in chloroform using tetramethylsilane as reference exhibits the following characteristics:

| δ (p.p.m.) | Relative area |
|---|---|
| 11.67 | 1 |
| 7.25 | 4 |
| 3.9–2.3 | 11 |
| 1.42 | 2 |
| 0.73 | 2 |
| 0.48 | 2 |

EXAMPLE 46.—3 - Methyl-1,2,3,4-tetrahydro-3-benzazocine Hydrochloride.—This material is prepared by methylation of 1,2,3,4-tetrahydro-3-benzazocine with formic acid and formaldehyde according to Example 36. The product is obtained in 81% yield, m.p. 213–214.5° C.

*Anal.*—calcd. for $C_{12}H_{15}N \cdot HCl$: C, 68.72; H, 7.69; N, 6.68. Found: C, 68.76; H, 7.61; N, 6.61.

EXAMPLE 47. 1,2,3,4,5,6-Hexahydro - 3 - (2-propynyl) - 3 - benzazocine Hydrochloride.—A mixture of 0.04 moles of 1,2,3,4,5,6-hexahydro-3-benzazocine in 50 ml. of anhydrous ether is treated with a solution of 0.045 mole of butyl lithium in hexane during a 15 min. period. The mixture is then refluxed for 1 hr., and then treated with 0.04 mole of freshly distilled propargyl bromide dissolved in 25 ml. of anhydrous ether. The mixture is again refluxed for 1 hr. and kept at room temperature overnight. It is then filtered, the filtrate extracted with three portions of 10% aqueous hydrochloric acid, and the aqueous extract neutralized. The product which separates on neutralization is collected by extraction with ether. The ether extracts are dried and then treated with hydrogen chloride gas, resulting in precipitation of the desired product which is recrystallized from ethanol-ether and then from acetonitrile; yield 28%, m.p. 199–200° C.

*Anal.*—calcd. for $C_{14}H_{17}N \cdot 2HCl$: C, 71.32; H, 7.68; N, 5.94; Cl, 15.04. Found: C, 71.40; H, 7.79; N, 5.98; Cl, 14.90.

Infrared absorption maxima are exhibited as follows: 3.14, 3.4, 3.9, 4.70, 6.1, 6.68, 6.75, 6.9, 7.58, 9.5, 10.13, 13.1–13.2μ.

EXAMPLE 48. 12,3,4,5,6-Hexahydro - 3 - (3-methyl-2-butenyl) - 3 - benzazocine hydrochloride.—A mixture of 0.058 mole of 1,2,3,4,5,6-hexahydro-3-benzoazocine, 0.06 mole of freshly distilled dimethylallyl bromide, and 0.08 mole of sodium bicarbonate in 150 ml. of dimethylformamide is refluxed for 4½ hrs. The mixture is cooled, insoluble material removed by filtration, washed with absolute ethanol, combined filtrates concentrated *in vacuo*. The residue is diluted with ether and any further insoluble material removed by filtration. The ether solution is extracted with 10% aqueous hydrochloric acid, and the aqueous extract then neutralized. Crude 1,2,3,4,5,6-hexahydro-3-(3-methyl-2-butenyl)benzazocine separates and is recovered by extraction with methylene chloride. It is purified by chromatography on basic alumina with benzene, and the hydrochloride salt prepared by treatment of the clear eluate with ethanolic HCl. Material is recrystallized from a mixture of propyl ether and acetonitrile, yield, 66%, m.p. 171–172.5° C. (dec.).

*Anal.*—calcd. for $C_{15}H_{23}N \cdot HCl$: C, 72.29; H, 9.10; N, 5.27; Cl, 13.34. Found: C, 72.12; H, 9.01; N, 5.13; Cl, 13.14.

This substance exhibits the following infrared absorption maxima: 3.42, 3.8, 3.9, 4.0–4.1, 5.98, 6.1, 6.68, 6.75, 6.88, 7.01, 7.26, 10.85, 12.1, and 13.06µ. Nuclear magnetic resonance spectrum prepared with a 10% solution in deuteriumoxide using 3 - (trimethylsilyl)-1-propanesulfonic acid sodium salt as reference exhibits the following characteristics:

| δ (p.p.m.) | Relative area |
| --- | --- |
| 7.43 | 4 |
| 5.29 | 1 |
| 3.52 | 2 |
| 2.7–3.5 | 8 |
| 1.92 | 2 |
| 1.77 | 3 |
| 1.67 | 3 |

EXAMPLE 49. 3-Cyclohex-2-enyl)-1,2,3,4,5,6-hexahydro-3-benzazocine.—The procedure of Example 48 is repeated substantially as described, substituting cyclohex-2-enyl bromide for dimethylallyl bromide as starting material. Product forms in substantially the same manner and is recovered as described above.

EXAMPLE 50. 3-Cyclohexyl-1,2,3,4,5,6-hexahydro-3-benzazocine.—The product of Example 49, 0.01 mole, is hydrogenated in ethanolic solution employing platinum oxide as catalyst and a pressure of about 50 lbs. per square inch. After the absorption of 0.01 mole of hydrogen, the product is recovered by filtration of the catalyst and evaporation of the filtrate.

EXAMPLE 51. Ethyl 1,2,3,4,5,6 - Hexahydro-3-benzazocine-3-propionate Hydrochloride.—A mixture of 0.02 mole of 1,2,3,4,5,6-hexahydrobenzazocine and 0.022 mole of ethyl acrylate in 5 ml. of absolute methanol is allowed to stand overnight at room temperature. The mixture is then acidified with concentrated hydrochloric acid, the solvent evaporated *in vacuo*, and the residue dissolved in absolute ethanol. Insoluble material is removed by filtration, after treatment of the mixture with decolorizing charcoal, and ether is added to precipitate the desired product as a white solid. It is recrystallized from isopropanol-ether, yield 51%, m.p. 201.5–202° C.

*Anal.*—calcd. for $C_{16}H_{23}NO_2 \cdot HCl$: C, 64.52; H, 8.12; N, 4.70; Cl, 11.91. Found: C, 64.60; H, 8.30; N, 4.94; Cl, 11.81.

EXAMPLE 52. 1,2,3,4,5,6-Hexahydro-3-(3-hydroxypropyl)-3-benzazocine.—The product of the preceding example, 0.02 mole, is reduced with 0.012 mole of lithium aluminum hydride in substantially the fashion described in Example 37, resulting in production of the desired product. This substance can be esterified and etherified under conventional reaction conditions to provide 3-(3-alkoxypropyl)-1,2,3,4,5,6-hexahydro - 3 - benzazocine and 3-(3-alkanoyloxypropyl) - 1,2,3,4,5,6 - hexahydro - 3 - benzazocine of the present invention.

EXAMPLE 53. Diethyl [(1,2,3,4,5,6-hexahydro-3-benzazocine - 3 - yl)methylene]malonate.—A mixture of 0.04 mole each of 1,2,3,4,5,6-hexahydro-3-benzazocine and diethyl ethoxymethylene malonate in 50 ml. of absolute ethanol is refluxed for 1 hr. It is then concentrated *in vacuo*, leaving an oil which is distilled, b.p. 192–194° C./0.05 mm. The oil solidifies and is recrystallized from 95% ethanol, affording the desired product in 64% yield, m.p. 90.5–94° C.

*Anal.*—Calcd. for $C_{19}H_{25}NO_4$: C, 68.86; H, 7.60; N, 4.23. Found: C, 68.70; H, 7.90; N, 4.12.

Infrared absorption maxima are observed at the following wave lengths: 3.4, 5.9, 6.23, 6.86, 7.04, 7.11, 7.32, 7.53, 7.62, 7.72, 7.90, 8.01, 8.13, 8.31, 8.48, 8.81, 9.41, 9.72, 10.11, 11.6, 12.01, 12.75, and 13.08µ.

EXAMPLE 54. 8,9-Dimethoxy-1,2,3,4,5,6-hexahydro-6 - hydroxy - 3 - (2-phenethyl)-3-benzazocine Hydrochloride.—A solution of 4.7 g. (0.02 mole) of 8,9-dimethoxy-1,2,3,4,5,6 - hexahydro - 6 - hydroxy - 3 - benzazocine in 100 ml. of isopropanol in which 4.2 g. (0.03 mole) of potassium carbonate is suspended is treated in dropwise fashion with 4.6 g. (0.025 mole) of (2-bromoethyl)benzene. The mixture is then refluxed for 22 hrs. and insoluble material removed by filtration. The filtrate is acidified with hydrogen chloride and then concentrated *in vacuo* until all of the solvent is removed. The residue is twice recrystallized from isopropanol, yield 5.8 g. (77%), m.p. 196–197.5° C.

*Anal.*—Calcd. for $C_{21}H_{27}NO_3 \cdot HCl$: C, 66.74; H, 7.46; N, 3.71. Found: C, 66.67; H, 7.39; N, 3.68.

EXAMPLE 55. 1,2,3,4,5,6-Hexahydro-3-(2-phenethyl)-6,8,9-trihydroxy) - 3 - benzazocine Hydrochloride.—The product of Example 54, 0.5 g., is refluxed with 25 ml. of 48% aqueous hydrogen bromide for 1 hr. The mixture is cooled and the supernatent liquid is decanted. The remaining gummy solid is dissolved in acetone from which solution the product crystallizes, m.p. 306–308° C.

*Anal.*—Calcd. for $C_{19}H_{23}NO_3 \cdot HBr$: C, 57.87; H, 6.14; N, 3.55; Br, 20.27. Found: C, 58.48; H, 6.40; N, 3.57; Br, 19.78.

EXAMPLE 56. 3-Allyl-8,9-dimethoxy-1,2,3,4,5,6-hexahydro-6-hydroxy - 3 - benzazocine Hydrobromide.—The method of Example 54 is repeated with the substitution of an equivalent quantity of allyl bromide for the (2-bromoethyl)benzene specified in that example. The product is crystallized from an acetonitrile, m.p. 206–208° C.

EXAMPLE 57.—8,9-Dimethoxy-1,2,3,4,5,6-hexahydro-6-hydroxy - 3 - methyl-3-benzazocine.—8,9-Dimethoxy-3-formyl-1,2,3,4,5,6-hexahydro-6-hydroxy-3-benzazocine 2.3 g. (0.0088 mole) is reduced with 1.6 g. of lithium aluminum hydride according to the procedure given in Example 37. The desired product is obtained in a yield of 1.3 g. (59%) and is recrystallized from isopropyl acetate-hexane to yield purified product, m.p. 118–121° C.

*Anal.*—Calcd. for $C_{14}H_{21}NO_3$: C, 66.90; H, 8.42; N, 5.57. Found: C, 66.98; H, 8.61; N, 5.36.

EXAMPLE 58. 3-Benzenesulfonyl-8,9-dihydroxy-1,2,3,4,5,6 - hexahydro - 3 - benzazocine - 6 - one.—3-Benzene sulfonyl - 8,9 - dimethoxy-1,2,3,4,5,6-hexahydro - 3 - benzazocin-6-one, 50 g. (0.13 mole) and 150 g. (0.54 mole) of aluminum bromide is refluxed for 16 hrs. The mixture is then poured into 300 ml. of water and the precipitated solid is collected on a filter and air-dried. It is triturated with acetone, insoluble material removed by filtration, and the solvent removed from the filtrate by distillation *in vacuo*.

EXAMPLE 59. Analgesic Treatment.—The method of Hindershot and Forsaith, J. Pharmacology Experimental Therapeutics *125*, 237 (1959) is employed to demonstrate the analgesic effect of the substances of Formulas I and II in mice. Groups of 10 to 20 mice are injected subcutaneously with different doses of the test compound. At the time of peak effect of the injected dose, which is separately determined previously for each compound, the animals receive an intraperitoneal injection of 2.5 mg./kg. of phenylquinone. The total number of writhing episodes exhibited by each mouse is counted for a period of 10 min. The average number for the group is calculated and the result obtained is compared with that obtained with a group of control mice which receive a similar injection of phenylquinone but no test drug. The percent decrease in the number of writhing episodes is calculated and the values obtained for each of the various doses of test compound are used to prepare a dose response curve. From this graph the dose required to give a 50% decrease in incidence of writhing is estimated by interpolation. In this test aspirin at a dose of 20 mg./kg. of body weight reduces the number of episodes by 50%. Representative compounds of Formulas I and II had a similar capacity, but at somewhat higher doses.

EXAMPLE 60. Tablets for Oral Use.—The following materials are thoroughly blended, dried and the batch then fed to a tableting machine to provide 1,000 tablets each containing 400 mg. of 1,2,3,4,5,6-hexahydro-3-methyl-3-benzazocine hydrochloride (Example 36).

|  | G. |
|---|---|
| Product of Example 36 | 400 |
| Polyvinylpyrrolidone | 34 |
| Crystalline cellulose | 200 |
| Corn starch, U.S.P. | 20 |
| Stearic acid powder | 12 |
| Magnesium stearate | 4 |

What is claimed is:

1. A compound selected from the group consisting of compounds of the formula

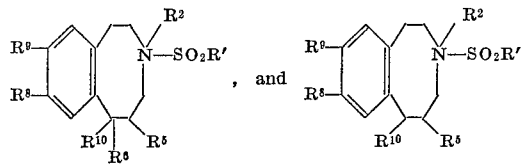

, and wherein $R^2$ and $R^5$ are each selected from the group consisting of hydrogen and lower alkyl having from 1 to 4 carbon atoms;

$R'$ is selected from the group consisting of lower alkyl having up to 6 carbon atoms, aryl, and aralkyl each having up to 12 carbon atoms;

$R^6$ is selected from the group consisting of hydrogen, hydroxy, chloro, and bromo;

$R^8$ and $R^9$ are selected from the group consisting of hydrogen, hydroxy, lower alkyl having up to 4 carbon atoms, and lower alkoxy having up to 4 carbon atoms, and $R^8$ and $R^9$ together form the methylenedioxy group; and $R_{10}$ is selected from the group consisting of hydrogen, alkyl having up to 8 carbon atoms, and aryl having up to 10 carbon atoms.

2. The compound of Claim 1; 3-benzenesulfonyl-6-hydroxy-1,2,3,4,5,6-hexahydro-3-benzazocine.

3. The compound of Claim 1; 3-benzenesulfonyl-6-chloro-1,2,3,4,5,6-hexahydro-3-benzazocine.

4. The compound of Claim 1; 3-benzenesulfonyl-1,2,3,4,5,6-hexahydro-3-benzazocine.

5. The compound of Claim 1; 3-benzenesulfonyl-1,2,3,4-tetrahydro-3-benzazocine.

6. The compound of Claim 1; 1,2,3,4,5,6-hexahydro-6-hydroxy-3-methanesulfonyl-3-benzazocine.

7. The compound of Claim 1; 3-benzenesulfonyl-8,9-dimethoxy-1,2,3,4,5,6-hexahydro-6-hydroxy-3-benzazocine.

8. The compound of Claim 1; 3-benzenesulfonyl-1,2,3,4,5,6-hexahydro-6-hydroxy-6-methyl-3-benzazocine.

9. The compound of Claim 1; 3-benzenesulfonyl-1,2,3,4,5,6-hexahydro-6-methyl-3-benzazocine.

References Cited
UNITED STATES PATENTS 3,442,890   5/1969   Larsen et al. ____ 260—239 BB ALTON D. ROLLINS, Primary Examiner U.S. Cl. X.R.

260—340.5; 424—244, 282

UNITED STATES PATENT OFFICE
CERTIFICATE OF CORRECTION

Patent No. 3,840,522            Dated October 8, 1974

Inventor(s) William T. Comer; Aubrey A. Larsen; Homer C. Scarborough, deceased; and Phyllis Jean Scarborough, widow and personal representative It is certified that error appears in the above-identified patent and that said Letters Patent are hereby corrected as shown below:

Column 15, line 20, delete both formulas and insert the following:

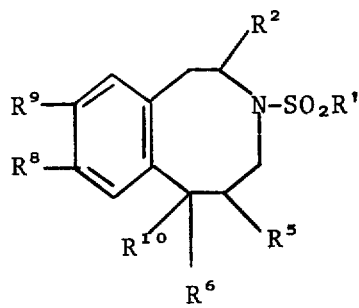 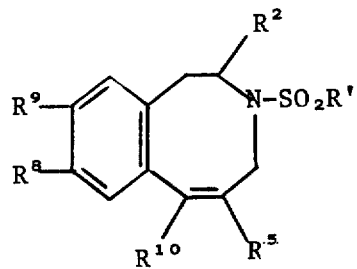

Signed and Sealed this

*Fifteenth* Day of *May 1979*

[SEAL]

Attest:

RUTH C. MASON
*Attesting Officer*

DONALD W. BANNER
*Commissioner of Patents and Trademarks*